United States Patent [19]
Cheng et al.

[11] Patent Number: 5,939,119
[45] Date of Patent: Aug. 17, 1999

[54] COATING FOR NUTS

[75] Inventors: Pu-Sheng Cheng, Dublin; John M. Hamm, Marysville, both of Ohio

[73] Assignee: Nestec S.A., Vevey, Switzerland

[21] Appl. No.: 09/104,770

[22] Filed: Jun. 25, 1998

[51] Int. Cl.⁶ .................................................. A23B 9/14
[52] U.S. Cl. ........................... 426/302; 426/89; 426/93; 426/307; 426/309; 426/629; 426/632
[58] Field of Search ................................. 426/89, 93, 98, 426/99, 102, 103, 302, 306, 307, 309, 629, 632, 442, 443

[56] References Cited

U.S. PATENT DOCUMENTS

| | | | |
|---|---|---|---|
| 2,725,831 | 12/1955 | Zimmer | 426/306 X |
| 3,323,922 | 6/1967 | Durst | 426/98 X |
| 3,798,338 | 3/1974 | Galle | 426/93 X |
| 4,649,057 | 3/1987 | Thomson | 426/532 |
| 4,849,233 | 7/1989 | Hemker | 426/93 |
| 4,880,646 | 11/1989 | Lew et al. | 426/93 |
| 5,094,874 | 3/1992 | Zook | 426/93 X |
| 5,147,670 | 9/1992 | Cebula et al. | 426/98 |
| 5,552,167 | 9/1996 | Chrysam et al. | 426/302 X |

FOREIGN PATENT DOCUMENTS

| | | |
|---|---|---|
| 2444412 | 8/1980 | France . |
| 2555414 | 5/1985 | France . |
| 1418149 | 10/1968 | Germany . |
| 52-054047 | 5/1977 | Japan . |
| 53-038646 | 4/1978 | Japan . |
| 57-083266 | 5/1982 | Japan . |
| 61-012267 | 1/1986 | Japan . |

OTHER PUBLICATIONS

JP 57083266 Abstract from 11.4 Agriculture—Food Products, Section C, Secion No. 122, vol. 06, No. 169, p. 18, Sep. 2, 1982, "Preparation of Edible Coating Material" by Sekizuka Yasuo, inventor.

J. Agric. Food Chem, 44 (7), 1736–1740 (16 ref.), 1996, J. Mate et al., "Whey Protein Isolate Edible Coatings: Effect on the Rancidity Process of Dry Roasted Peanuts".

Food Processing, USA 1984, 45 (13) 48–49, C. Andres, "Natural Edible Coating has Execllent Moisture and Grease Barrier Properties".

At A Glance, 2 (1), 2 (0 ref.), 1992, Anon, Edible Coatings Extend Storage Life of Fruits and Vegetables.

News Sci. 148 (2004), 36–37 (0 ref.), 1995, M. Knott, "Don't Chuck it, eat it".

Prep. Foods, 156 (3), 174, 1987, Anon, "Extending Shelf Life with Edible Films".

Dep. of Food Sci., Chalmers Univ. of Techn., Gothenbur, Sweden, SIK Rapport 1996, No. 623, 112 pp., M. Anker, Edible and Biodegradable Films and Coatings for Food Packaging—a Literature Review.

J.M. Krochta, Dep. of Food Sci. & Tech., University of California, Davis, CA 95616, USA, *Journal of Food Science*, 1996 61 (2) 465–468, 472, J. Mate et al., Peanut and Walnut Rancidity: Effects of Oxygne Concentration and Relative Humidity.

*Primary Examiner*—Milton Cano
*Attorney, Agent, or Firm*—Pennie & Edmonds LLP

[57] ABSTRACT

A process for coating nuts which comprises immersing the nuts in a molten edible material which is solid at ambient temperature to coat the nuts with molten edible material, separating the excess molten edible material and then cooling the coated nuts to solidify the molten edible material.

19 Claims, 1 Drawing Sheet

COATING FOR NUTS

FIELD OF THE INVENTION

The present invention relates to a coating for nuts more especially to a process for coating nuts.

BACKGROUND OF THE INVENTION

During storage, peanuts begin to become rancid and this rancidity becomes stronger with time. In addition, the peanut flavor fades away. The rancidity is known to occur from the oxidation reaction between peanut oil and oxygen. The reason for the flavor fading is not yet clear. One way of minimizing the oxidation reaction is to block oxygen entering the peanut through encapsulation technology, i.e. to coat the peanut with a certain wall material to reduce the rate of oxygen entering the peanut.

Many attempts have been made to coat nuts by spray coating technology to prevent the rancidity. The materials used in the spray coating are either high melting point fats (e.g. hydrogenated fats), or solvent (including water) soluble carbohydrates (e.g. starch, modified starches), or protein (e.g. whey protein, zein). The disadvantages of spray coating methods are (1) most of them are batch systems, (2) it takes a very skillful person to operate the systems to obtain a continuous and uniform coating on the surface of nuts. This is because spray coating is constructed by overlaying of droplets. Most of time, the overlaying droplets do not form a coating as continuous and uniform as it could be and, therefore, spray coating does not provide a complete barrier to oxygen.

Other attempts to coat nuts have used coating materials such as low melting point oils, e.g. soybean oil, cotton oil, coconut oil but in general these liquid oils do not have a sufficiently low oxygen permeability to protect the nuts from oxidation reactions to extend the shelf life.

We have found, surprisingly, that by inmersing nuts in a liquid edible coating material which solidifies at ambient temperature and then separating the excess coating material from the nuts, we can obtain a continuous coating on the surface of the nuts which not only surprisingly retards the formation of the rancidity but also, unexpectedly, retards the flavor fading.

SUMMARY OF THE INVENTION

According to the present invention there is provided a process for coating nuts which comprises immersing the nuts in a molten edible material which is solid at ambient temperature to coat the nuts with molten edible material, separating the excess molten edible material and then cooling down the coated nuts to solidify the molten edible material.

DETAILED DESCRIPTION OF THE INVENTION

Figure 1:
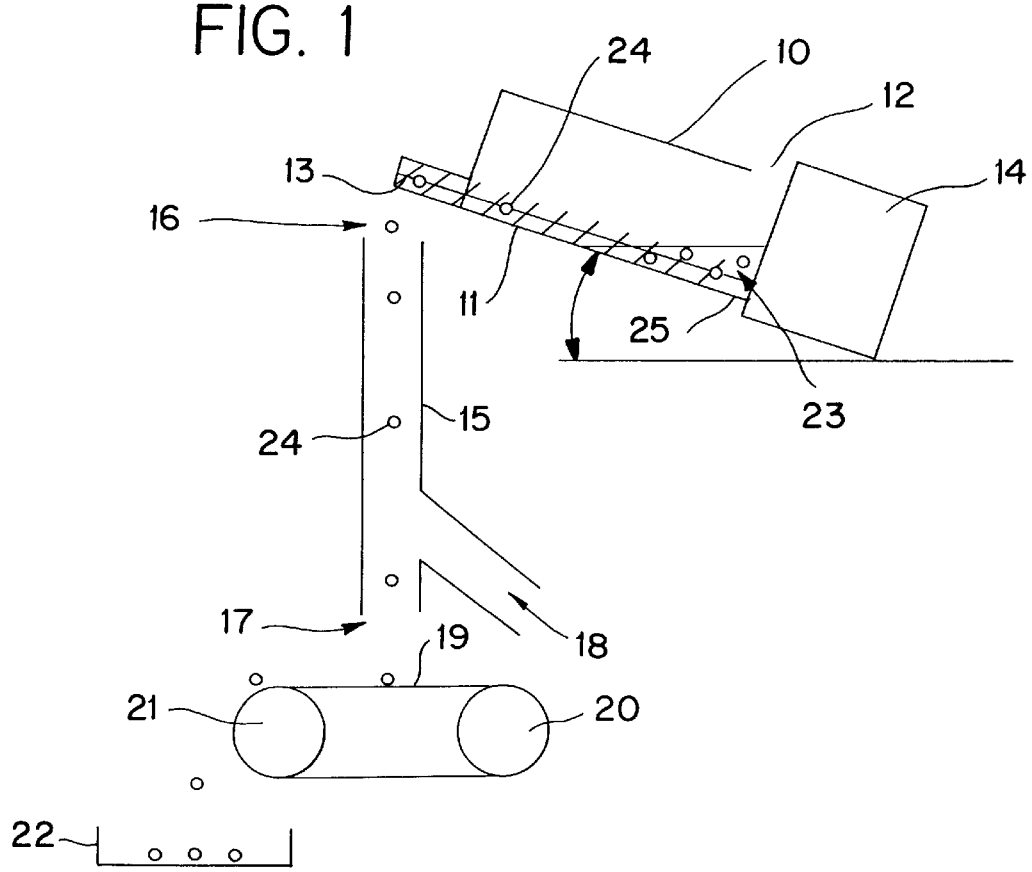
FIG. 1 illustrates the apparatus for carrying out the coating process of the invention.

The process of the invention may be applied to any kind of nut, for example, peanuts, almonds or hazel nuts. The nut may, if desired, sugar coated or honey roasted such as sugar coated peanuts or honey roasted peanuts.

The nuts may advantageously be roasted nuts. In this case, the process of the present invention may be combined with a conventional nut roasting process or it may be carried out after the roasting stage.

The edible material preferably has a melting point above 40° C., conveniently from 50° to 120° C. It is possible to use edible materials with a melting point higher than 120° C., if desired.

The edible material may be, for instance, a hydrogenated vegetable fat, a medium to long chain fatty acid, or a medium to long chain alcohol or a wax. An especially advantageous hydrogenated vegetable fat is hydrogenated soybean oil. The long chain fatty acid may have a chain length of from 8 to 30 carbon atoms and preferably from 12 to 24 carbon atoms, for example, stearic acid. An example of an alcohol is stearyl alcohol. An example of a suitable wax is carnuba wax.

The process of the invention may be carried out by feeding both the nuts and the edible material into a reservoir which is maintained at a temperature higher than the melting point of the edible material, transporting the nuts coated with the molten edible material out of the reservoir by a conveyer which is capable of draining excess molten edible material back to the reservoir, and passing the coated nuts through a cooling tunnel to solidify the coating.

The feeding of nuts and coating material can be operated either continuously or batchwise.

The edible coating material may preferably be melted, but not necessarily, before being fed into the reservoir at the desired rate relative to the feed rate of nut. Preferably, a pool of molten edible coating material is present in the reservoir when the nuts and edible coating material are fed into the reservoir.

Advantageously, the cooling tunnel is positioned with its longitudinal axis vertically or substantially vertically to enable the coated nuts to fall by gravity from the inlet to the outlet of the cooling tunnel.

After exiting the outlet of the cooling tunnel, the coated nuts are conveniently received on a conveyor belt on which they are transported to a collecting receptacle. The conveyor belt is preferably made of a soft material, e.g. plastic, to minimise any gravitational impact on the coating in the case where the coated nuts fall by gravity onto the conveyor belt.

The amount of edible liquid material coated onto the nuts may be from 1 to 10%, preferably from 2 to 5%, and more preferably from 2.5 to 4.5% by weight based on the weight of the nuts. The larger the nut, the less will be the proportion of edible liquid material coated onto it.

Preferably, the reservoir is a screw feeder for transportation of nuts. The screw feeder may be tilted at an angle with the outlet elevated at a higher level than the inlet, for instance, at an angle of from 5° to 60° for removing any excess molten edible coating material. The screw feeder may be provided with a jacketed heating device for maintaining a temperature higher than the melting point of the edible material.

The molten edible material may be placed in the jacket screw feeder so that it covers at least part of the lower surface, e.g. when the screw feeder is tilted, the liquid edible material covers the lower surface at least at the upstream end. The amount of liquid edible material in the screw feeder is preferably sufficient to coat the nuts.

The nuts may conveniently be fed into the upstream end of the screw feeder by gravity, e.g. from a hopper at the desired rate so that they fall into the edible molten medium where they are mixed and conveyed to the outlet by the screw.

Advantageously, the coated nuts are cooled in a cooling tunnel after they have exited the screw feeder. For instance, the nuts may be cooled by a cold gas, e.g. cold air or nitrogen gas flowing through a cooling tunnel. The nitrogen gas may be obtained by evaporating liquid nitrogen.

The coated nuts should be cooled to a temperature below the melting point of the edible molten coating material and preferably to ambient temperature when exiting from cooling tunnel.

The cooling gas preferably enters from the bottom of the cooling tunnel at a velocity of about 90 percent of fluidization velocity to maximize the efficiency of the cooling effect.

The present invention also provides coated nuts obtainable by a process as hereinbefore described.

The process of the present invention can be easily combined with the oil roasting of nuts. This can be achieved by roasting nuts in oils having a melting point higher than ambient temperature. After roasting, the nuts are transported out of the oil, the excess oil drained off, and then the coated nuts cooled individually in a cooling tunnel below the melting point of the oil.

The process of the present invention is easy to operate, easy to scale up, easy to operate continuously and can readily be integrated with any production line for the manufacture of confectionery materials such as chocolate in which nuts are added as inclusions, e.g. BABE RUTH.

Figure 2:
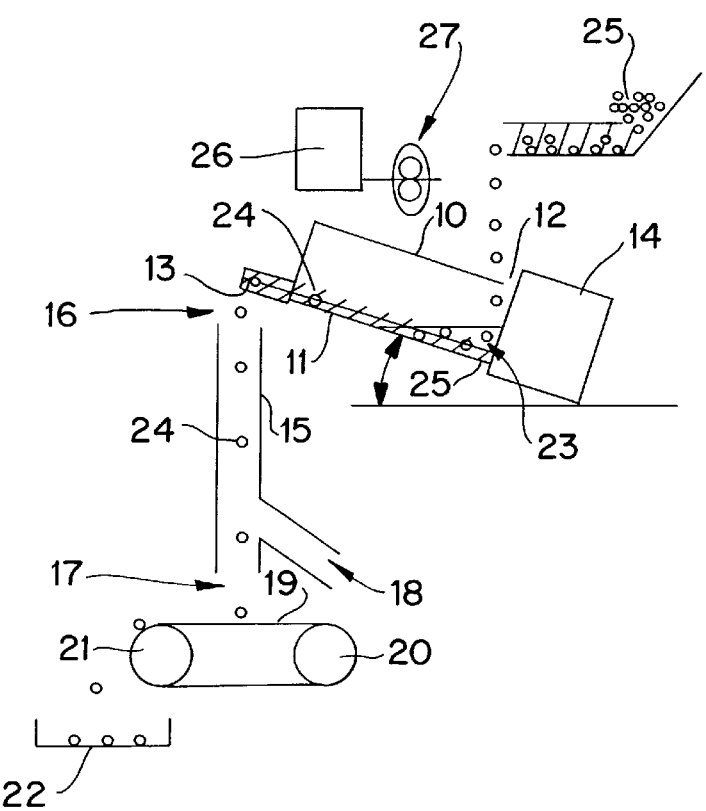
FIG. 2 illustrates an embodiment of the apparatus for carrying out the coating process of the invention.

The present invention will now be further described and illustrated with reference to the following drawings in which FIGS. 1 and 2 represent a schematic view of a practical apparatus for coating the nuts.

Referring to FIG. 1, a jacket screw feeder 10 tilted at an angle of 30° to the horizontal is provided with a feed screw 11, an inlet 12 and an outlet 13. The feed screw is driven by a motor 14. Positioned below the outlet 13, is a cooling tunnel 15 with an inlet for the coated nuts 16, an outlet 17 and an inlet for cold nitrogen gas 18. Positioned below the outlet 17 of the cooling tunnel is a soft plastic conveyor belt 19 with an upstream end 20 and a downstream end 21. Positioned below the downstream end of the conveyor belt is a receptacle 22 for receiving the cooled coated nuts.

FIG. 2 shows a similar device to FIG. 1 with the addition of screw feeder 25, a separate reservoir 26 and a metering pump 27.

In batch operation, melted hydrogenated soy bean oil 23 is poured into the screw feeder 10, and peanuts 24 are dropped into the jacket screw feeder and mixed with the melted hydrogenated soy bean oil which maintains the temperature at about 75° C. The feed screw 11 is set in motion by the motor and the peanuts coated with the melted hydrogenated soy bean oil are conveyed to the outlet 13 from where they are conveyed by gravity into the inlet 16 of the cooling tunnel 15. Nitrogen gas evaporated from liquid is fed into the cooling tunnel through the inlet 18 to cool the melted hydrogenated soy bean oil coating until it solidifies. The cooled coated peanuts 24 fall by gravity onto the conveyor belt 19 travelling in the direction of the arrow and they fall off the downstream end 21 into the receptacle 22. Unused melted hydrogenated soy bean oil is drained off at 25.

The amount of melted hydrogenated soy bean oil coating on the peanuts is 3.5% by weight based on the weight of the nuts. A substantially continuous coating is formed. After storage over a period of 9 months, a tasting panel of 4 expert people found that the coated peanuts showed significantly less rancidity taste compared with a control sample of uncoated peanuts. In addition, the coated peanuts maintained a strong peanut flavour which is lacking in a control sample of uncoated peanuts. There was no significant soybean oil off-flavor.

A similar procedure was followed but using melted carnuba wax instead of the melted hydrogenated soy bean oil. After storage over a period of 9 months, the same tasting panel of 4 expert people found that the coated peanuts showed significantly less rancidity taste compared with a control sample of uncoated peanuts. In addition, the coated peanuts maintained a strong peanut flavour which is lacking in a control sample of uncoated peanuts.

The process can also be operated in continuous mode as shown in FIG. 2 where peanuts and hydrogenated soybean oil are continuously fed into the jacket screw feeder 10. The peanuts can be fed into system by another screw feeder 25 or by any conveying system which have a capability of rate control without cracking the nuts. The hydrogenated soybean oil can be melted in a separate reservoir 26 and metered into the jacket screw feeder at the desired rate relative to the feed rate of peanuts by means of the metering pump 27. Then the coated peanuts are exited without excess coating material, and cooled to the room temperature in the cooling tunnel.

We claim:

1. A process for coating nuts with an edible material which comprises feeding the nuts and edible material which is solid at ambient temperature into a reservoir which is maintained at a temperature higher than the melting point of the edible material to melt the edible material and coat the nuts with molten edible material, transporting the nuts coated with the molten edible material out of the reservoir by a conveyor which is capable of draining excess molten material back into the reservoir, and then cooling the coated nuts to solidify the molten edible material thereon.

2. A process according to claim 1 in which the nuts are peanuts, almonds or hazel nuts.

3. A process according to claim 1 in which the nuts are roasted nuts.

4. A process according to claim 1 wherein the liquid edible material has a melting point above 40° C.

5. A process according to claim 1 wherein the liquid edible material is a hydrogenated vegetable fat, a medium to long chain fatty acid, a protein, a carbohydrate, an alcohol or a wax.

6. A process according to claim 1 wherein the liquid edible material is hydrogenated soybean oil, stearic acid or stearyl alcohol.

7. A process according to claim 1 wherein the feeding of nuts and coating material is operated either continuously or batchwise.

8. A process according to claim 7 wherein the edible coating material is melted, before being fed into the reservoir at the desired rate relative to the feed rate of nut.

9. A process according to claim 1 wherein a pool of molten edible coating material is present in the reservoir when the nuts and edible coating material are fed into the reservoir.

10. A process according to claim 1 wherein the cooling tunnel is positioned with its longitudinal axis vertically or substantially vertically to enable the coated nuts to fall by gravity from the inlet to the outlet of the cooling tunnel.

11. A process according to claim 1 wherein the nuts are cooled by cold air or nitrogen gas flowing through the cooling tunnel.

12. A process according to claim 1 wherein after exiting the outlet of the cooling tunnel, the coated nuts are received on a conveyor belt on which they are transported to a collecting receptacle.

13. A process according to claim 1 wherein the amount of edible liquid material coated onto the nuts is from 1 to 10% by weight based on the weight of the nuts.

14. A process according to claim 13 wherein the screw feeder is tilted at an angle with the outlet elevated at a higher level than the inlet for removing any excess molten edible coating material.

15. A process according to claim 13 wherein the screw feeder is tilted at an angle of from 5° to 60°.

16. A process according to claim 13 wherein the screw feeder is provided with a jacketed heating device for maintaining a temperature higher than the melting point of the edible material.

17. A process according to claim 13 wherein the molten edible material is placed in the jacket screw feeder so that it covers at least part of the lower surface.

18. A process according to claim 1 wherein the reservoir is a screw feeder for transportation of nuts.

19. A process according to claim 1 wherein the cooling of the nuts coated with molten edible material is conducted in a cooling tunnel.

* * * * *